US012441111B2

(12) United States Patent
Kawaguchi et al.

(10) Patent No.: US 12,441,111 B2
(45) Date of Patent: Oct. 14, 2025

(54) RECORDING DEVICE

(71) Applicant: SEIKO EPSON CORPORATION, Tokyo (JP)

(72) Inventors: Yuta Kawaguchi, Shiojiri (JP); Shoji Akatsu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 187 days.

(21) Appl. No.: 18/162,070

(22) Filed: Jan. 31, 2023

(65) Prior Publication Data

US 2023/0241891 A1 Aug. 3, 2023

(30) Foreign Application Priority Data

Feb. 1, 2022 (JP) ................................. 2022-014209

(51) Int. Cl.

*B41J 2/145* (2006.01)
*B41J 2/175* (2006.01)
*B41J 25/00* (2006.01)

(52) U.S. Cl.

CPC ........... *B41J 2/145* (2013.01); *B41J 2/17523* (2013.01); *B41J 2/17596* (2013.01); *B41J 25/001* (2013.01)

(58) Field of Classification Search

CPC .... B41J 2/145; B41J 2/17523; B41J 2/17596; B41J 25/001; B41J 2/175; B41J 2/17509; B41J 19/005; B41J 29/02; B41J 2/045
See application file for complete search history.

(56) References Cited

FOREIGN PATENT DOCUMENTS

| | | | |
|---|---|---|---|
| JP | 2001-171145 A | | 6/2001 |
| JP | 2006-205741 A | | 8/2006 |
| JP | 2007-136785 A | | 6/2007 |
| JP | 2020032591 A | * | 3/2020 |

OTHER PUBLICATIONS

Matsuzaki Kazutoshi, Recording Device (JP 2020032591 A), Mar. 5, 2020, Description of Embodiments (1st Embodiment) (Year: 2020).*

* cited by examiner

*Primary Examiner* — Lisa Solomon
(74) *Attorney, Agent, or Firm* — WORKMAN NYDEGGER

(57) ABSTRACT

A recording device includes a head, a main body portion, a carriage provided with the head and configured to be able to reciprocate along a guide shaft, and an ink tube configured to supply ink to the head from an ink accommodating portion disposed at the main body portion. The carriage includes a guided portion supported by the guide shaft, a tube holding unit attached to the guided portion and configured to hold the ink tube, and a head placement portion where the head is disposed, the head placement portion being attached to the guided portion. An attachment portion where the tube holding unit is attached to the guided portion includes a displacement portion configured such that the tube holding unit is displaced relative to the guided portion when external force equal to or greater than a threshold value acts on the tube holding unit.

10 Claims, 8 Drawing Sheets

RECORDING DEVICE

The present application is based on, and claims priority from JP Application Serial Number 2022-014209, filed on Feb. 1, 2022, the disclosure of which is hereby incorporated by reference herein in its entirety.

BACKGROUND

1. Technical Field

The present disclosure relates to a recording device.

2. Related Art

Various types of recording devices have been used. Of these recording devices, there is a recording device including a carriage that reciprocates and configured to perform recording by supplying ink from an ink accommodating portion disposed at a main body portion to a head provided at the carriage through an ink tube. For example, JP-A-2007-136785 discloses a recording device configured to perform recording by supplying ink from an ink tank disposed at a main body portion to a recording head provided at a head carriage through a supply tube.

In a case of a recording device configured to perform recording by supplying ink from an ink accommodating portion disposed at a main body portion to a head provided at a carriage through an ink tube as with the recording device in JP-A-2007-136785, there is a case in which force acts on the ink tube in association with the reciprocation of the carriage. When the force acts on the ink tube, force in, for example, a direction intersecting the reciprocating direction of the carriage acts on the carriage through the ink tube. In addition, due to the force acting on the carriage through the ink tube, the carriage may be displaced from a guide shaft configured to guide the movement of the carriage, and turn into an unintended state.

SUMMARY

A recording device according to the present disclosure used to solve the problem described above includes a head configured to discharge ink on a recording medium, a main body portion provided with a guide shaft, a carriage provided with the head and configured to reciprocate along the guide shaft, and an ink tube having a one-end side coupled to an ink accommodating portion disposed at the main body portion, the ink tube being configured to supply ink to the head, in which the carriage includes a guided portion supported by the guide shaft, a tube holding unit attached to the guided portion and configured to hold another-end side of the ink tube, and a head placement portion at which the head is disposed, the head placement portion being attached to the guided portion, and an attachment portion where the tube holding unit is attached to the guided portion includes a displacement portion configured such that the tube holding unit is displaced relative to the guided portion when external force equal to or greater than a threshold value acts on the tube holding unit.

DESCRIPTION OF EXEMPLARY EMBODIMENTS

Figure 1:
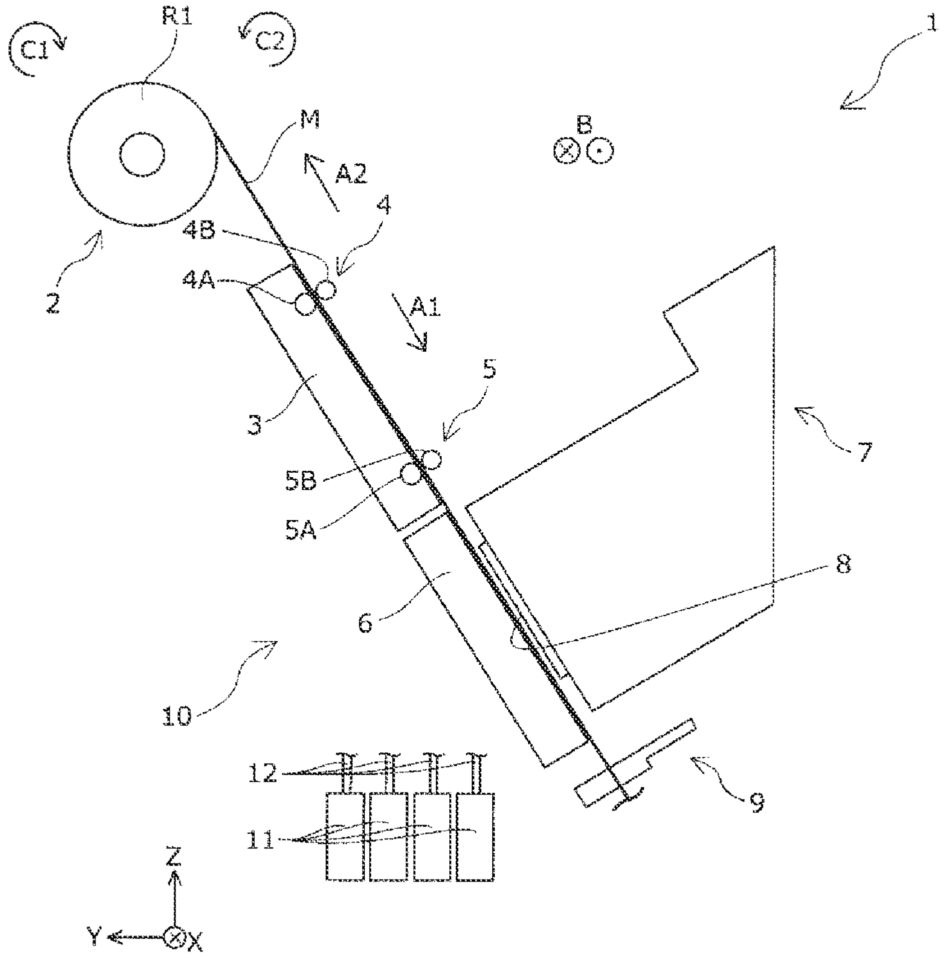
FIG. 1 is a schematic view illustrating a recording device according to a first embodiment of the present disclosure.

First, the present disclosure will be schematically described.

A recording device according to a first aspect of the present disclosure used to solve the problem described above includes: a head configured to discharge ink on a recording medium; a main body portion provided with a guide shaft; a carriage provided with the head and configured to reciprocate along the guide shaft; and an ink tube having a one-end side coupled to an ink accommodating portion disposed at the main body portion, the ink tube being configured to supply ink to the head, in which the carriage includes: a guided portion supported by the guide shaft; a tube holding unit attached to the guided portion and configured to hold another-end side of the ink tube; and a head placement portion at which the head is disposed, the head placement portion being attached to the guided portion, and an attachment portion where the tube holding unit is attached to the guided portion includes a displacement portion configured such that the tube holding unit is displaced relative to the guided portion when external force equal to or greater than a threshold value acts on the tube holding unit.

With the present aspect, the carriage includes: the guided portion supported by the guide shaft; the tube holding unit attached to the guided portion and configured to hold the ink tube; and the head placement portion where the head is disposed, the head placement portion being attached to the guided portion. In addition, the attachment portion where the tube holding unit is attached to the guided portion includes the displacement portion configured such that the tube holding unit is displaced relative to the guided portion when external force equal to or greater than a threshold value acts on the tube holding unit. Thus, even when external force equal to or greater than a threshold value acts on the tube holding unit by way of the ink tube or the like, the tube holding unit is displaced relative to the guided portion with the displacement portion being the base. This makes it possible to prevent the guided portion from being displaced relative to the guide shaft to be into an unintended state, and prevent the carriage from being displaced from the guide shaft and turning into an unintended state.

In the first aspect, the recording device according to a second aspect of the present disclosure is configured such that the tube holding unit is in contact with the guided portion at a contact portion having a flat top end, and the contact portion has a curved shape portion protruding as a curved surface from a base end to the top end.

With the present aspect, the tube holding unit is in contact with the guided portion at the contact portion having the flat top end, and the contact portion has the curved shape portion protruding as a curved surface from the base end to the top end. Thus, even when external force less than a threshold value acts, it is possible to favorably suppress displacement of the tube holding unit relative to the guided portion with the contact portion having a flat top end. In addition, when external force equal to or greater than a threshold value acts, it is possible to cause the tube holding unit to be smoothly displaced relative to the guided portion along the curved shape portion. This makes it possible to prevent the guided portion and the tube holding unit from being damaged.

In the first or second aspect, the recording device according to a third aspect of the present disclosure is configured such that the displacement portion includes: a shaft member coupling the tube holding unit to the guided portion in a displaceable manner; and an elastic member where elastic force acts such that the tube holding unit is not displaced relative to the guided portion.

With the present aspect, the displacement portion includes: the shaft member coupling the tube holding unit to the guided portion so as to be able to be displaced; and an elastic member where elastic force acts such that the tube holding unit is not displaced relative to the guided portion. This makes it possible to configure the displacement portion in a more simplified manner using the shaft member and the elastic member.

In the third aspect, the recording device according to a fourth aspect of the present disclosure is configured such that the shaft member is configured to be displaced in an extending direction.

With the present aspect, the shaft member is able to be displaced in the extending direction. Thus, it is possible to set a threshold value of the displacement portion in a wide range.

In the fourth aspect, the recording device according to a fifth aspect of the present disclosure includes a plurality of the shaft members, and a displacement amount of each of the shaft members differs from each other.

With the present aspect, a plurality of the shaft members are provided, and a displacement amount of each of the shaft members differs from each other. Thus, when external force equal to or greater than a threshold value acts on the tube holding unit, it is possible to cause the tube holding unit to be displaced relative to the guided portion in a particularly favorable state and range.

In any one of the third to fifth aspects, the recording device according to a sixth aspect of the present disclosure includes a plurality of the elastic members, and elastic force of each of the elastic members differs from each other.

With the present aspect, the plurality of the elastic members are provided, and the elastic force of each of the elastic members differs from each other. Thus, when external force equal to or greater than a threshold value acts on the tube holding unit, it is possible cause the tube holding unit to be displaced relative to the guided portion in a particularly favorable state and range.

In the sixth aspect, the recording device according to a seventh aspect of the present disclosure is configured such that the ink tube is passed through the tube holding unit from a first direction, and elastic force of each of the elastic members is set such that elastic force of a second elastic member provided at a side opposite to the first direction is higher than elastic force of a first elastic member provided at a side of the first direction.

With the present aspect, the ink tube is passed through the tube holding unit from the first direction, and elastic force of each of the elastic members is set such that elastic force of the second elastic member is higher than the elastic force of the first elastic member provided at the first direction side. By using this configuration, when external force equal to or greater than a threshold value acts on the tube holding unit, it is possible to particularly favorably prevent the guided portion from being displaced relative to the guide shaft so as to turn into an unintended state, and it is possible to particularly favorably prevent the carriage from being displaced from the guide shaft to turn into an unintended state.

In the seventh aspect, the recording device according to an eighth aspect of the present disclosure is configured such that the carriage includes a plurality of the tube holding units each configured to hold the ink tube from the first direction.

With the present aspect, the carriage includes the plurality of the tube holding units each configured to hold the ink tube from the first direction. By using this configuration, in the configuration in which a plurality of the tube holding units are provided, it is possible to particularly favorably prevent the guided portion from being displaced relative to the guide shaft so as to turn into an unintended state, and it is possible to particularly favorably prevent the carriage from being displaced from the guide shaft to turn into an unintended state.

First Embodiment

Below, embodiment according to the present disclosure will be specifically described with reference to the drawings. First, the outline of a recording device 1 according to a first embodiment of the present disclosure will be described with reference to FIG. 1. Note that a portion of the component members is not illustrated in FIG. 1 in order to make the configuration easily understood. Here, in the drawing, the X-axis direction is a horizontal direction, and is a direction in which a rotary shaft of a holding unit 2 extends, the holding unit 2 being configured to hold a roll body R1 in which a recording medium M is wound repeatedly in a roll form. The Y-axis direction is a horizontal direction, is a front-rear direction of the recording device 1, and is a direction perpendicular to the X-axis direction. The Z-axis direction is a vertical direction. In addition, below, the arrowed direction is set as a +direction, and a direction opposite to the arrowed direction is set as a −direction. For example, the vertically upward direction is set as a +Z direction. The vertically downward direction is set as a −Z direction. The frontward of the recording device 1 is set as a −Y direction. The rearward of the recording device 1 is set as a +Y direction.

The recording device 1 according to the present embodiment includes the holding unit 2 configured to hold the roll body R1 in which the recording medium M is wound repeatedly in a roll form. In addition, in the recording device 1 according to the present embodiment, the holding unit 2 including a rotary shaft along the X-axis direction rotates in a rotational direction C1 when the recording medium M is transported in a normal transport direction A1 that is a so-called regular transport direction. Furthermore, the holding unit 2 including the rotary shaft along the X-axis direction rotates in a rotational direction C2 when the recording medium M is transported in a reversed transport direction A2 opposite to the normal transport direction A1. Note that the present embodiment employs the roll body R1 that is wound such that the recording surface on which recording is performed faces outward. However, when a roll body R1 that is wound such that the recording surface faces inward is employed, the holding unit 2 rotates in the rotational direction C2 and can deliver the recording medium M from the roll body R1.

Furthermore, the recording device 1 according to the present embodiment includes a platen 3 and a platen 6 serving as a medium support portion configured to support the recording medium M. Of these platens, the platen 6 is a medium support portion provided at a position that is opposed to a head 8 that will be described later. In addition, the recording device 1 includes a transport roller pair 4 including a driving roller 4A and a driven roller 4B, and also includes a transport roller pair 5 including a driving roller 5A and a driven roller 5B, each of which serves as a transport unit used to transport the recording medium M in the normal transport direction A1 and the reversed transport direction A2 in the transport path.

Furthermore, the recording device 1 according to the present embodiment includes the head 8 and a carriage 7. The head 8 is disposed at a position that is opposed to the platen 6, is provided with a plurality of nozzles, and serves as a recording unit configured to discharge ink from the nozzles to perform recording. The carriage 7 is able to reciprocate in a width direction B, and the head 8 is mounted at the carriage 7. Detailed configuration of the carriage 7 will be described later. Note that, in the recording device 1 according to the present embodiment, a surface of the platen 6 that supports the recording medium M is sloped relative to the horizontal direction, and a direction of ink discharged from the head 8 is sloped relative to the vertical direction. However, the configuration is not limited to such a configuration, and it may be possible to employ a configuration in which the surface of the platen 6 that supports the recording medium M extends in the horizontal direction, and the direction of ink discharged from the head 8 extends in the vertical direction.

The recording device 1 according to the present embodiment is able to accommodate an ink accommodating portion 11 in a main body portion 10 including a guide shaft 13, which will be described later, the platen 6, or the like. In addition, a one-end side of an ink tube 12 configured to supply ink to the head 8 is coupled to the ink accommodating portion 11 disposed in the main body portion 10. Note that another-end side of the ink tube 12 is held by the carriage 7, and is further coupled to the head 8. Note that the other-end side of the ink tube 12 is held by the carriage 7 from the +X direction side (from behind the paper surface in FIG. 1) toward the −X direction side (toward the direction coming out from the paper surface in FIG. 1) that is a direction corresponding to a second direction B2 in FIG. 3 that will be described later.

In the recording device 1 according to the present embodiment, the head 8 is configured to discharge ink from a nozzle (not illustrated) on the recording medium M to be transported while reciprocating in the width direction B that is a direction intersecting the normal transport direction A1 and the reversed transport direction A2, whereby it is possible to perform printing. The recording device 1 according to the present embodiment is able to form a desired image on the recording medium M by repeating transporting of the recording medium M by a predetermined transport amount in the normal transport direction A1 and discharging ink while moving the head 8 in the width direction B in a state in which the recording medium M is at rest.

Furthermore, a cutter 9 configured to move along the width direction B to cut the recording medium M along the width direction B is provided downstream of the head 8 in the transport direction A. However, it may be possible to employ a configuration in which no cutter 9 is provided.

In this manner, the recording device 1 according to the present embodiment includes the head 8 configured to discharge ink on the recording medium M, and the main body portion 10 where the guide shaft 13 is provided. Furthermore, there is provided the carriage 7 provided with the head 8 and configured to be able to reciprocate along the guide shaft 13. In addition, there is also provided the ink tube 12 configured to supply ink to the head 8 and having the one-end side coupled to the ink accommodating portion 11 disposed at the main body portion 10.

Figure 2:
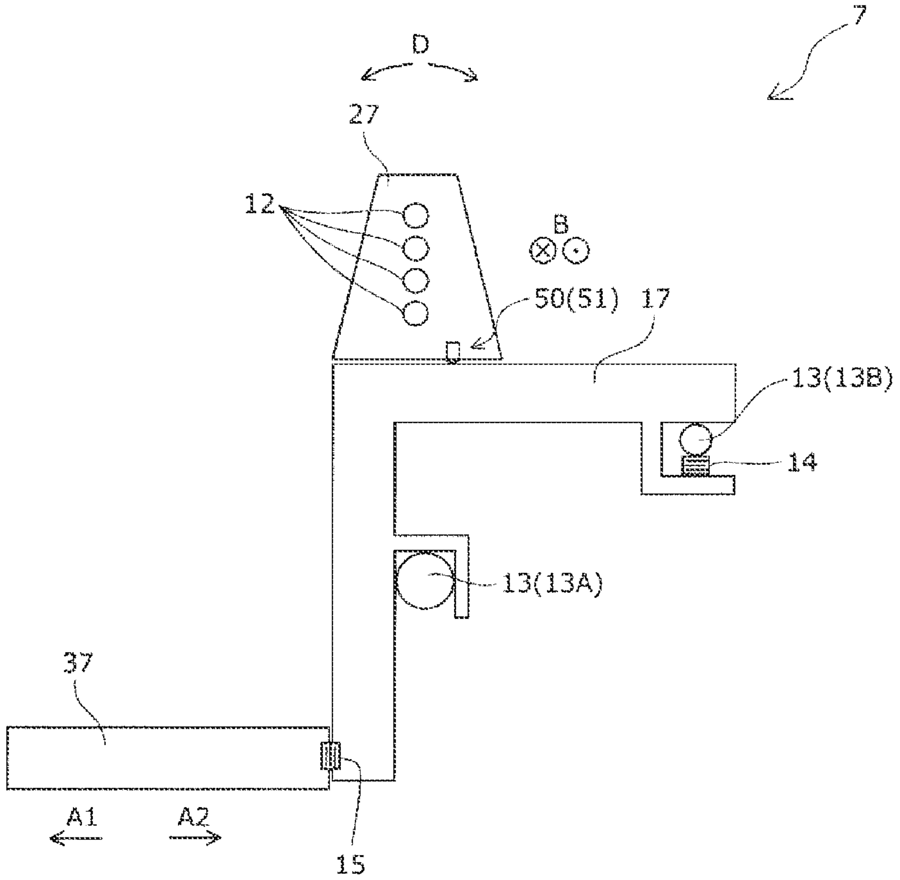
FIG. 2 is a schematic view illustrating a carriage of the recording device in FIG. 1.

Next, the configuration of the carriage of the recording device 1 according to the present embodiment will be described in detail with reference to FIGS. 2 to 8. As illustrated in FIG. 2, the carriage 7 according to the present embodiment includes a guided portion 17 supported by the guide shaft 13, a tube holding unit 27 attached to the guided portion 17 and configured to hold the other-end side of the ink tube 12, and a head placement portion 37 where the head 8 is disposed, the head placement portion 37 being attached to the guided portion 17. The tube holding unit 27 is attached to the guided portion 17 with the attachment portion 50. The head placement portion 37 is attached to the guided portion 17 with a spring member 15. Note that the carriage 7 according to the present embodiment has a configuration in which the head placement portion 37 and the guided portion 17 are separately provided, and the head placement portion 37 is attached to the guided portion 17 with the spring member 15, whereby the head placement portion 37 is able to move. However, the configuration of the carriage 7 is not limited to such a configuration. For example, the head placement portion 37 and the guided portion 17 may be integrally formed.

The recording device 1 according to the present embodiment includes a main shaft 13A and a secondary shaft 13B as the guide shaft 13. Both the main shaft 13A and the secondary shaft 13B are provided so as to extend in the width direction B, and both ends thereof are fixed to the frame (not illustrated) provided at the main body portion 10. The guided portion 17 is in contact with the main shaft 13A and the secondary shaft 13B. Of these shafts, the secondary shaft 13B is biased with a spring member 14. With such a configuration, when external force acts on the carriage 7, the entire carriage 7 is able to rotate in a rotational direction D with the main shaft 13A being the rotational movement shaft.

However, in a case of a typical carriage 7 configured to be able to rotate with the guide shaft 13 being the rotational movement shaft when external force acts on the carriage 7, when strong external force acts on the carriage 7, the carriage 7 may be detached from the guide shaft 13 or the like, and the carriage 7 may be displaced and turn into an unintended state. For example, in a case of the configuration in which the tube holding unit 27 configured to hold the ink tube 12 is provided in the carriage 7, external force is more likely to act on the ink tube 12 in association with reciprocating of the carriage 7 along the width direction B. As external force acts on the ink tube 12, the external force is transmitted through the tube holding unit 27 to the guided portion 17. This may lead to displacement of the carriage 7 to turn into an unintended state.

Figure 8:
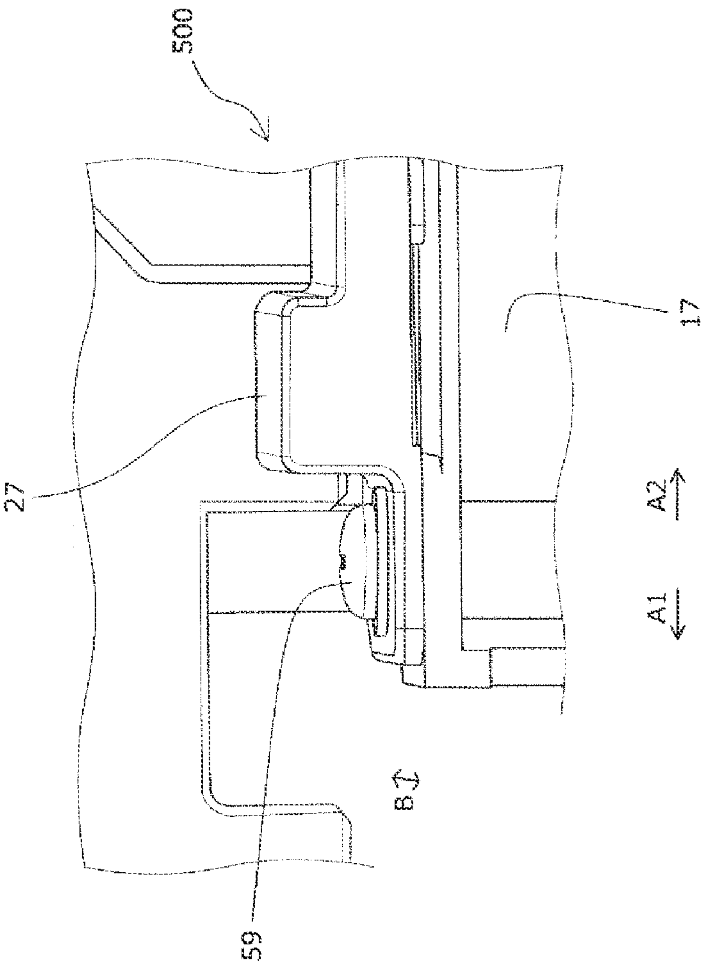
FIG. 8 is a perspective view illustrating an attachment portion and its surrounding of a carriage of a recording device according to a reference example.

Here, as illustrated in FIG. 8, in a recording device 1 according to a reference example having a typical configuration, an attachment portion 500 is configured such that the tube holding unit 27 is fixed tightly to the guided portion 17 with a screw 59 so as not to move. With such a configuration, when external force acts on the ink tube 12, the external force is transmitted, without being reduced, to the guided portion 17 through the tube holding unit 27. Thus, the carriage 7 may be detached from the guide shaft 13 or the like, and the carriage 7 is likely to be displaced and turn into an unintended state.

Figure 4:
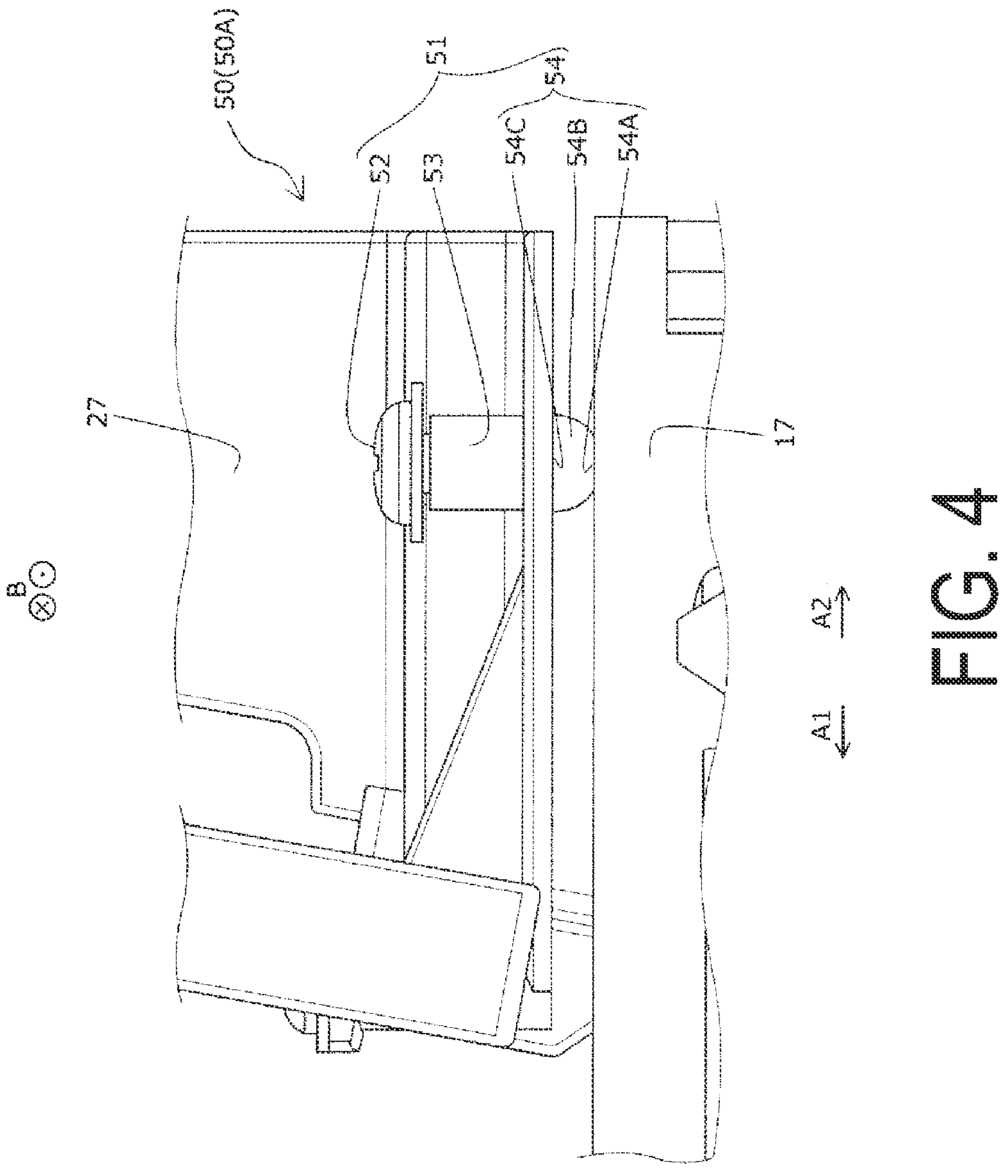
FIG. 4 is a side view illustrating an attachment portion and its surrounding of the carriage of the recording device in FIG. 1.
Figure 5:
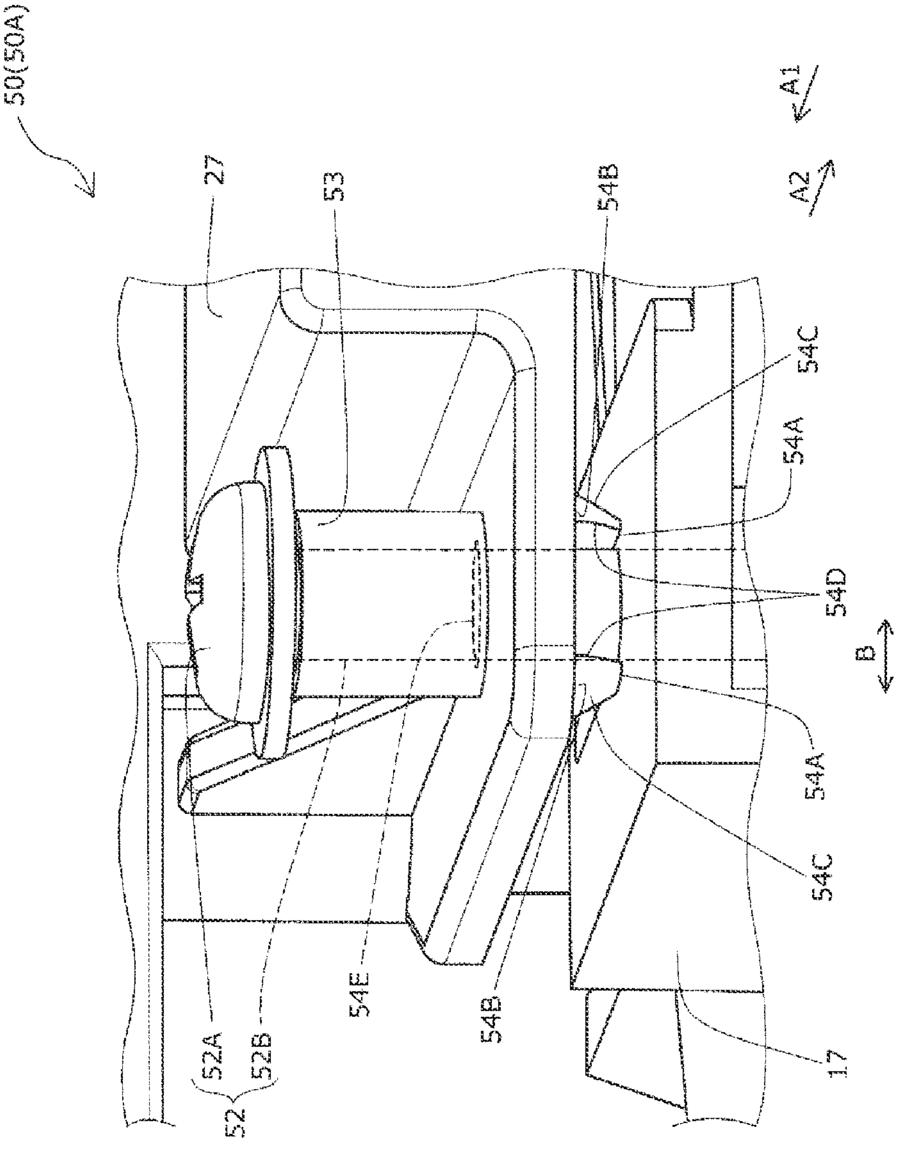
FIG. 5 is a perspective view illustrating the attachment portion and its surrounding of the carriage of the recording device in FIG. 1.
Figure 6:
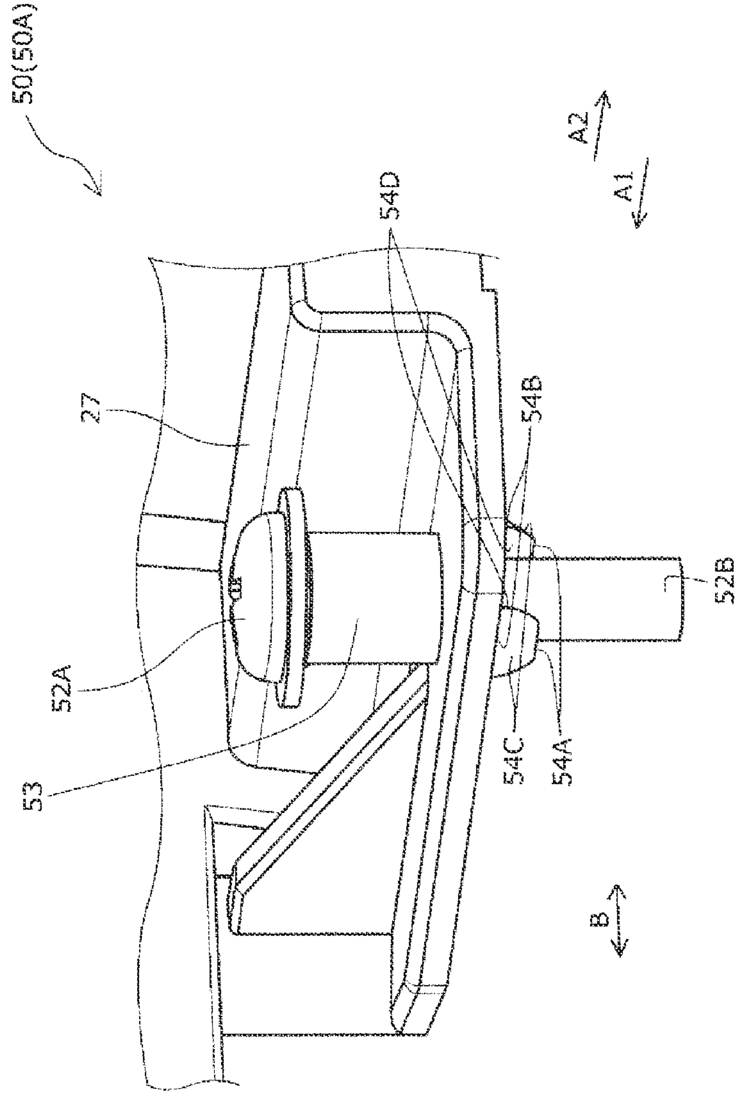
FIG. 6 is a perspective view illustrating a configuration of the attachment portion of the carriage of the recording device in FIG. 1.

In contrast, in the recording device 1 according to the present embodiment, the attachment portion 50 where the tube holding unit 27 is attached to the guided portion 17 is configured to include a displacement portion 51 where the tube holding unit 27 is displaced relative to the guided portion 17 when external force equal to or greater than a threshold value acts on the tube holding unit 27. Specifically, as illustrated in FIGS. 4 to 6, the attachment portion 50 includes the displacement portion 51 including a screw 52, a coil spring 53 caused to pass through a body portion 52B of the screw 52, and a contact portion 54 of the tube holding unit 27 relative to the guided portion 17. More specifically, configuration is made such that: the screw 52 includes a screw head 52A and the body portion 52B; the body portion 52B penetrates through a hole portion 54E provided in the tube holding unit 27; the body portion 52B is fixed to the guided portion 17; the hole portion 54E is formed so as to be wider than the body portion 52B; and the coil spring 53 is interposed between the screw head 52A and a portion of the tube holding unit 27 where the hole portion 54E is formed.

That is, the recording device 1 according to the present embodiment is configured such that the tube holding unit 27 is displaced relative to the body portion 52B fixed to the guided portion 17, for example, when force equal to or greater than spring force of the coil spring 53 acts on the tube holding unit 27. Thus, at the displacement portion 51, when external force less than a threshold value acts on the tube holding unit 27, the coil spring 53 is not displaced, and the displacement portion 51 maintains its posture. However, at the displacement portion 51, when external force equal to or greater than the threshold value acts on the tube holding unit 27, the coil spring 53 is displaced, and the tube holding unit 27 is displaced relative to the guided portion 17 with the contact portion 54 being the fulcrum.

The recording device 1 according to the present embodiment includes the attachment portion 50 having such a configuration. Thus, even when external force equal to or greater than a threshold value acts on the tube holding unit 27 through the ink tube 12 or the like, the tube holding unit 27 is displaced relative to the guided portion 17 with the displacement portion 51 being the base, which prevents strong force from acting on the guided portion 17. This enables the recording device 1 according to the present embodiment to prevent the guided portion 17 from being displaced relative to the guide shaft 13 and turning into an unintended state. Furthermore, for this reason, the recording device 1 according to the present embodiment is able to prevent the carriage 7 from being displaced from the guide shaft 13 and turning into an unintended state.

Here, the tube holding unit 27 is in contact with the guided portion 17 at the contact portion 54. In addition, as illustrated in FIG. 6, a top end 54A of the contact portion 54 is configured to have a flat shape, and the top end 54A is configured to be brought into surface contact or line contact with the guided portion 17. Furthermore, as illustrated in FIGS. 4 and 6, a curved shape portion 54C protruding as a curved surface is formed from the base end 54B to the top end 54A of the contact portion 54. Thus, even when external force less than a threshold value acts on the tube holding unit 27, it is possible to favorably suppress displacement of the tube holding unit 27 relative to the guided portion 17 with the contact portion 54 having the flat top end 54A. In addition, when external force equal to or greater than a threshold value acts on the tube holding unit 27, it is possible to cause the tube holding unit 27 to be smoothly displaced relative to the guided portion 17 along the curved shape portion 54C, and it is possible to prevent the guided portion 17 and the tube holding unit 27 from being damaged.

Note that, in the present embodiment, a cutout 54D is formed at the normal transport direction A1 side and the reversed transport direction A2 side of the curved shape portion 54C, as illustrated in FIG. 5. As this cutout 54D is formed, the tube holding unit 27 particularly easily moves relative to the guided portion 17 in directions along the normal transport direction A1 and the reversed transport direction A2.

Figure 3:
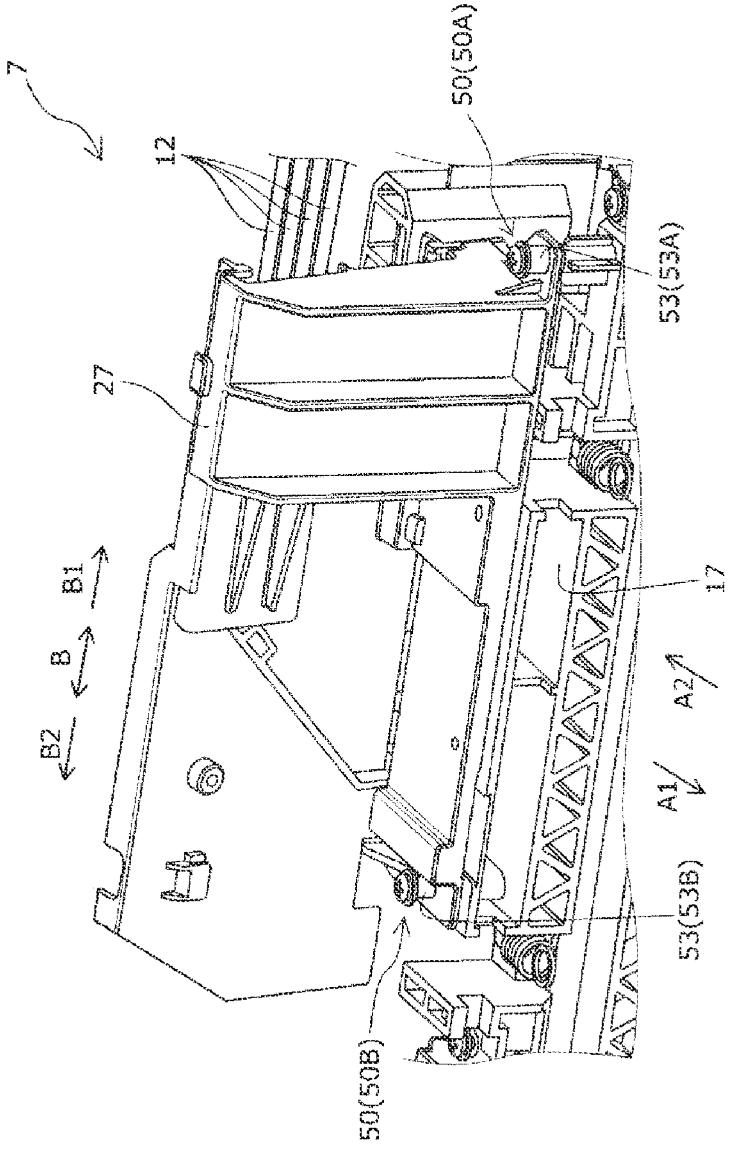
FIG. 3 is a perspective view illustrating the carriage of the recording device in FIG. 1.

In addition, as illustrated in FIG. 3, the recording device 1 according to the present embodiment includes, as the attachment portion 50, an attachment portion 50A disposed at a first direction B1 side that is a side where the ink tube is passed through, and an attachment portion 50B disposed at a side of a second direction B2 that is opposite to the first direction B1. Here, the attachment portion 50A and the attachment portion 50B are comprised of a similar component member. That is, in the recording device 1 according to the present embodiment, the displacement portion 51 having a similar configuration is provided at each of the attachment portion 50A and the attachment portion 50B. However, the coil spring 53 of the displacement portion 51 at the attachment portion 50A and the coil spring 53 of the displacement portion 51 at the attachment portion 50B differ from each other in the spring force. In other words, the recording device 1 according to the present embodiment includes a plurality of elastic members, and the elastic force of each of the elastic members differs from each other. By making the elastic force of each of the plurality of elastic members differ from each other, it is possible to cause the tube holding unit 27 to be displaced relative to the guided portion 17 in a particularly favorable state and range when external force equal to or greater than a threshold value acts on the tube holding unit 27.

Specifically, the ink tube 12 is passed through the tube holding unit 27 from the first direction B1. In addition, the spring force (elastic force of each of the elastic members) of the coil spring 53 of each of the attachment portion 50A and the attachment portion 50B is configured such that the spring force of a coil spring 53B that is a second elastic member provided at the leading end side of the second direction B2 is stronger than the spring force of the coil spring 53A that is a first elastic member provided at the leading end side of the first direction B1. With such a configuration, when external force equal to or greater than a threshold value acts on the tube holding unit 27, it is possible to particularly favorably prevent the guided portion 17 from being displaced relative to the guide shaft 13 and turning into an unintended state, and it is possible to particularly favorably prevent the carriage 7 from being displaced from the guide shaft 13 and turning into an unintended state.

Here, as described above, the screw 52 that constitutes the displacement portion 51 includes the screw head 52A and the body portion 52B. That is, the displacement portion 51 according to the present embodiment includes the body portion 52B serving as a shaft member that connects the tube holding unit 27 relative to the guided portion 17 so as to be able to be displaced, and the coil spring 53 serving as an elastic member where elastic force acts such that the tube holding unit 27 is not displaced relative to the guided portion 17. In this manner, it is preferable to employ a configuration in which the displacement portion 51 includes the shaft member coupling the tube holding unit 27 to the guided portion 17 in a displaceable manner, and the elastic member where elastic force acts such that the tube holding unit 27 is not displaced relative to the guided portion 17. This is because such a configuration makes it possible to configure the displacement portion 51 with the shaft member and the elastic member in a more simplified manner. Note that the shaft member may be configured differently from the body portion 52B of the screw 52, and the elastic member may be configured differently from the coil spring 53.

In particular, as for the shaft member, it is possible to favorably use, for example, a member having a configuration such as a damper structure that can be displaced in an extending direction. This is because, with such a configuration, it is possible to set the threshold value for the displacement portion 51 so as to have a wide range.

In addition, as described above, the recording device 1 according to the present embodiment includes a plurality of the attachment portions 50 including the displacement portion 51 having a similar configuration. That is, the recording device 1 according to the present embodiment includes a plurality of body portions 52B serving as the shaft members. Here, it is preferable that the displacement amount of each of the shaft members differs from each other. This is because, by making the displacement amount of each of the shaft members differ from each other, it is possible to cause the tube holding unit 27 to be displaced relative to the guided portion 17 in a particularly favorable state and range when external force equal to or greater than a threshold value acts on the tube holding unit 27.

Second Example

Figure 7:
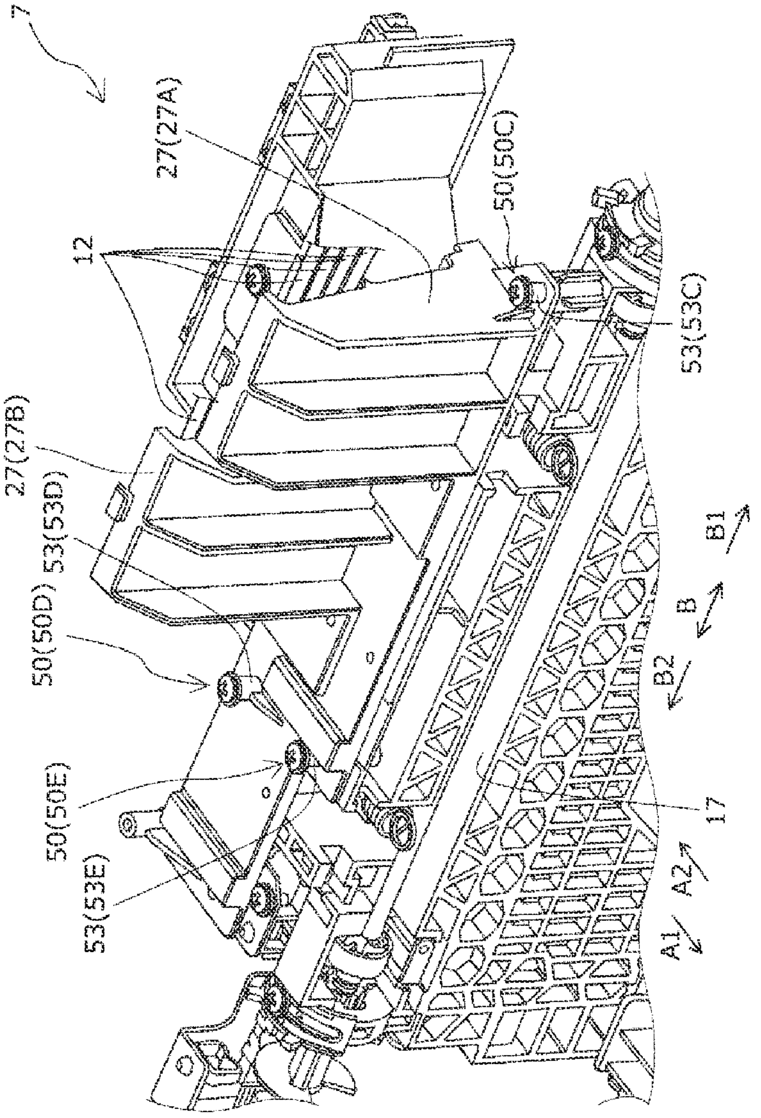
FIG. 7 is a perspective view illustrating a carriage of a recording device according to a second embodiment.

Below, a recording device 1 according to a second embodiment will be described with reference to FIG. 7. Note that FIG. 7 is a diagram corresponding to FIG. 3 concerning the recording device 1 according to the first embodiment. In addition, the recording device 1 according to the present embodiment has a configuration similar to that of the recording device 1 according to the first embodiment except for the configuration described below, and hence, has a characteristic similar to that of the recording device 1 according to the first embodiment. Thus, in FIG. 7, the same reference characters are attached to component members common to those in the first embodiment described above, and detailed explanation thereof will not be repeated.

As described above, in a case of the recording device 1 according to the first embodiment, one carriage 7 is provided with one tube holding unit 27. In contrast, as illustrated in FIG. 7, in a case of the recording device 1 according to the present embodiment, one carriage 7 is provided with a tube holding unit 27A, a tube holding unit 27B, and two tube holding units 27. In addition, as for the attachment portion 50, there are provided an attachment portion 50C, an attachment portion 50D, and an attachment portion 50E, each of which has a structure similar to that of the attachment portion 50A described above. That is, the recording device 1 according to the present embodiment also includes a plurality of body portions 52B serving as the shaft members.

Here, the ink tube 12 is passed through both the tube holding unit 27A and the tube holding unit 27B from the first direction B1. In addition, the elastic force of each of the elastic members of the attachment portion 50C, the attachment portion 50D, and the attachment portion 50E is configured such that the elastic force of each of the coil spring 53D and the coil spring 53E serving as a second elastic member provided at the second direction B2 side is stronger than the elastic force of the coil spring 53C serving as a first elastic member provided at the first direction B1 side. With such a configuration, when external force equal to or greater than a threshold value acts on the tube holding unit 27, it is possible to particularly favorably prevent the guided portion 17 from being displaced relative to the guide shaft 13 and turning into an unintended state, and it is possible to particularly favorably prevent the carriage 7 from being displaced from the guide shaft 13 and turning into an unintended state.

In addition, by employing a configuration in which the carriage 7 includes a plurality of tube holding units 27 each configured to hold the ink tube 12 from the first direction B1, it is possible to particularly favorably prevent the guided portion 17 from being displaced relative to the guide shaft 13 and turning into an unintended state in the configuration in which a plurality of the tube holding units 27 are provided. In addition, it is possible to particularly favorably prevent the carriage 7 from being displaced from the guide shaft 13 and turning into an unintended state.

The present disclosure is not limited to the present embodiments described above, and can be achieved in various configurations without departing from the gist of the present disclosure. Appropriate replacements or combinations may be made to the technical features in the present embodiments which correspond to the technical features in the aspects described in the SUMMARY section in order to solve some or all of the problems described above or to achieve some or all of the advantageous effects described above. In addition, when the technical features are not described herein as essential technical features, such technical features may be deleted as appropriate.

What is claimed is:

1. A recording device comprising:

a head configured to discharge ink on a recording medium;

a main body portion provided with a guide shaft;

a carriage provided with the head and configured to reciprocate along the guide shaft;

a transport section that transports the recording medium in a first direction that is a transport direction of the recording medium and that is orthogonal to a second direction along the guide shaft that is a movement direction of the carriage; and an ink tube having a one-end side coupled to an ink accommodating portion disposed at the main body portion, the ink tube being configured to supply ink to the head, wherein the carriage includes:

a guided portion supported by the guide shaft;

a tube holding unit attached to the guided portion and configured to hold another-end side of the ink tube; and a head placement portion at which the head is disposed, the head placement portion being attached to the guided portion, and an attachment portion where the tube holding unit is attached to the guided portion includes a displacement portion configured such that the tube holding unit is displaced relative to the guided portion in the first direction when external force equal to or greater than a threshold value acts on the tube holding unit.

2. The recording device according to claim 1, wherein the tube holding unit is in contact with the guided portion at a contact portion having a flat top end, and the contact portion has a curved shape portion protruding as a curved surface from a base end to the top end.

3. The recording device according to claim 1, wherein the displacement portion includes:

a shaft member coupling the tube holding unit to the guided portion in a displaceable manner; and an elastic member where elastic force acts such that the tube holding unit is not displaced relative to the guided portion.

4. The recording device according to claim 3, wherein the shaft member is configured to be displaced in an extending direction.

5. The recording device according to claim 4 comprising:

a plurality of the shaft members, wherein a displacement amount of each of the shaft members differs from each other.

6. The recording device according to claim 3 comprising:

a plurality of the elastic members, wherein elastic force of each of the elastic members differs from each other.

7. The recording device according to claim 6, wherein the ink tube is passed through the tube holding unit from a first direction, and elastic force of each of the elastic members is set such that elastic force of a second elastic member provided at a side opposite to the first direction is higher than elastic force of a first elastic member provided at a side of the first direction.

8. The recording device according to claim 7, wherein the carriage includes a plurality of the tube holding units each configured to hold the ink tube from the first direction.

9. The recording device according to claim 1, wherein the tube holding unit displaces in the first direction and in the second direction.

10. A recording device comprising:

a head configured to discharge ink on a recording medium;

a main body portion provided with a guide shaft;

a carriage provided with the head and configured to reciprocate along the guide shaft; and an ink tube having a one-end side coupled to an ink accommodating portion disposed at the main body portion, the ink tube being configured to supply ink to the head, wherein the carriage includes:

a guided portion supported by the guide shaft;

a tube holding unit attached to the guided portion and configured to hold another-end side of the ink tube; and a head placement portion at which the head is disposed, the head placement portion being attached to the guided portion, and an attachment portion where the tube holding unit is attached to the guided portion includes a displacement portion configured such that the tube holding unit is displaced relative to the guided portion when external force equal to or greater than a threshold value acts on the tube holding unit, wherein the tube holding unit is in contact with the guided portion at a contact portion having a flat top end, and the contact portion has a curved shape portion protruding as a curved surface from a base end to the top end.

* * * * *